(12) United States Patent
Yamanaka et al.

(10) Patent No.: US 8,304,476 B2
(45) Date of Patent: Nov. 6, 2012

(54) FLAME RETARDANT RESIN COMPOSITION AND MOLDED ARTICLE THEREOF

(75) Inventors: Katsuhiro Yamanaka, Chiyoda-ku (JP); Fumitaka Kondo, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 13/321,914

(22) PCT Filed: May 20, 2010

(86) PCT No.: PCT/JP2010/058941
§ 371 (c)(1),
(2), (4) Date: Nov. 22, 2011

(87) PCT Pub. No.: WO2010/137632
PCT Pub. Date: Dec. 2, 2010

(65) Prior Publication Data
US 2012/0077910 A1    Mar. 29, 2012

(30) Foreign Application Priority Data

May 26, 2009 (JP) ................................. 2009-126391
Jun. 22, 2009 (JP) ................................. 2009-147547

(51) Int. Cl.
*C08K 5/527* (2006.01)
(52) U.S. Cl. ....................................... 524/117; 524/451
(58) Field of Classification Search .................. 524/117, 524/451
See application file for complete search history.

(56) References Cited

U.S. PATENT DOCUMENTS

| | | | |
|---|---|---|---|
| 3,962,377 A | 6/1976 | Spivack | |
| 4,069,200 A | 1/1978 | Spivack | |
| 4,093,588 A | 6/1978 | Spivack | |
| 2004/0127611 A1 | 7/2004 | Yamanaka et al. | |
| 2006/0258816 A1 | 11/2006 | Endo | |
| 2007/0142503 A1 | 6/2007 | Yamada et al. | |

FOREIGN PATENT DOCUMENTS

| | | |
|---|---|---|
| GB | 1 476 994 | 6/1977 |
| GB | 1 515 223 | 6/1978 |
| JP | 50-60481 | 5/1975 |
| JP | 52-12329 | 1/1977 |
| JP | 2001-164014 | 6/2001 |
| JP | 2003-160722 | 6/2003 |
| JP | 2004-131580 | 4/2004 |
| JP | 2004-210968 | 7/2004 |
| JP | 2004-277552 | 10/2004 |
| JP | 2005-23260 | 1/2005 |
| JP | 2005-139441 | 6/2005 |
| JP | 2007-191546 | 8/2007 |
| JP | 2007-246730 | 9/2007 |
| JP | 2008-19294 | 1/2008 |
| WO | 2004/087809 | 10/2004 |

OTHER PUBLICATIONS

International Search Report issued Sep. 7, 2010 in International (PCT) Application No. PCT/JP2010/058941.
English translation of the International Preliminary Report on Patentability and Written Opinion dated Dec. 12, 2011.

*Primary Examiner* — Peter Szekely
(74) *Attorney, Agent, or Firm* — Wenderoth, Lind & Ponack, L.L.P.

(57) ABSTRACT

It is a purpose of the present invention to provide a flame retardant resin composition having a high level of flame retardancy and excellent physical properties and a molded article thereof.

The flame retardant resin composition comprises:

(A) 100 parts by weight of a resin component (component A) containing polylactic acid (component A-1);
(B) 10 to 50 parts by weight of an organic phosphorus compound represented by the following formula (1) (component B):

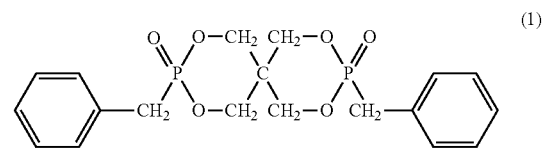

(in the above formula, the phenyl group may have a substituent);
(C) 5 to 30 parts by weight of a hydrogenated styrene-based thermoplastic elastomer (component C); and
(D) 1 to 10 parts by weight of talc (component D).

10 Claims, No Drawings

FLAME RETARDANT RESIN COMPOSITION AND MOLDED ARTICLE THEREOF

This application is a U.S. national stage of International Application No. PCT/JP2010/058941 filed May 20, 2010.

TECHNICAL FIELD

The present invention relates to a resin composition having flame retardancy and excellent physical properties and a molded article thereof. More specifically, it relates to a substantially halogen-free flame retardant resin composition comprising a specific organic phosphorus compound and a molded article thereof.

BACKGROUND ART

Resins such as polypropylenes (PP), acrylonitrile-butadiene-styrene (ABS), polyamides (PA6, PA66), polyesters (PET, PBT) and aromatic polycarbonates (PC) are used as raw materials for obtaining resin molded articles. These resins are produced from raw materials obtained from oil resources. In recent years, problems such as the depletion of oil resources and global environment have been concerned, and the production of a resin from a raw material obtained from biogenic matter such as a plant has been desired. Especially when a global environmental problem is taken into consideration, a resin obtained from a plant-derived raw material is regarded as a resin having a low load on the global environment from the concept "carbon neutral" which means that it is neutral in terms of the balance of carbon in view of the amount of carbon dioxide absorbed during the growth of a plant even when it is burnt after use.

Meanwhile, to use the resin obtained from a plant-derived raw material as an industrial material, especially an electric/electronic-related part, OA-related part or auto part, flame retardancy must be imparted to the resin from the viewpoint of safety.

Various attempts have been made for the flame retardation of resins obtained from plant-derived raw materials, especially polylactic acid resin, and a certain measure of flame retardation has been attained (Patent Documents 1 to 6). However, a large amount of a flame retardant is used to flame retard these resins, whereby the physical properties of the resins are impaired.

(Patent Document 1) JP-A 2001-164014
(Patent Document 2) JP-A 2004-277552
(Patent Document 3) JP-A 2005-023260
(Patent Document 4) JP-A 2005-139441
(Patent Document 5) JP-A 2007-246730
(Patent Document 6) JP-A 2008-019294

DISCLOSURE OF THE INVENTION

It is a first object of the present invention to provide a resin composition which has flame retardancy and excellent physical properties and a molded article thereof. It is a second object of the present invention to provide a substantially halogen-free flame retardant resin composition which comprises a specific organic phosphorus compound and a molded article thereof.

According to studies conducted by the inventors of the present invention, the above objects of the present invention are attained by a flame retardant resin composition comprising:

(A) 100 parts by weight of a resin component (component A) which contains polylactic acid (component A-1);

(B) 10 to 50 parts by weight of an organic phosphorus compound represented by the following formula (1) (component B):

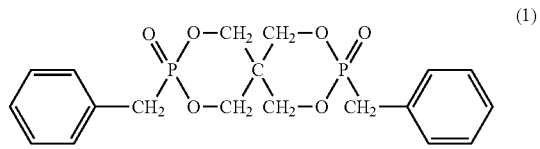

(in the above formula, the phenyl group may have a substituent.);

(C) 5 to 30 parts by weight of a hydrogenated styrene-based thermoplastic elastomer (component C); and (D) 1 to 10 parts by weight of talc (component D).

According to the present invention, a resin composition which achieves high flame retardancy without impairing the characteristic properties of a resin is obtained.

BEST MODE FOR CARRYING OUT THE INVENTION

The flame retardant resin composition of the present invention will be described in more detail hereinunder.

(Resin Component: Component A)

In the present invention, the resin component (component A) contains polylactic acid. The resin component (component A) contains the polylactic acid in an amount of preferably at least 50 wt %, more preferably at least 55 wt %, much more preferably at least 60 wt %. The content of the polylactic acid (component A-1) in the resin component (component A) is preferably 50 to 89 wt %, more preferably 55 to 85 wt %, much more preferably 60 to 80 wt %.

The resin component (component A) may contain an aromatic polycarbonate resin (component A-2) and a styrene-based resin (component A-3) in addition to the polylactic acid (component A-1). The content of the aromatic polycarbonate resin (component A-2) in the resin component (component A) is preferably 10 to 40 wt %, more preferably 14 to 38 wt %, much more preferably 19 to 35 wt %. The content of the styrene-based resin (component A-3) in the resin component (component A) is preferably 1 to 10 wt %, more preferably 1 to 7 wt %, much more preferably 1 to 5 wt %.

Preferably, the resin component (component A) contains 50 to 89 wt % of the polylactic acid (component A-1), 10 to 40 wt % of the aromatic polycarbonate resin (component A-2) and 1 to 10 wt % of the styrene-based resin (component A-3).

(Polylactic Acid: Component A-1)

The polylactic acid (component A-1) includes a polymer composed of only a lactic acid unit and a lactic acid copolymer composed of a lactic acid unit and another unit.

The polylactic acid (component A-1) is a polymer obtained from L-lactic acid, D-lactic acid, DL-lactic acid or a mixture thereof, or L-lactide which is a cyclic dimer of L-lactic acid, D-lactide which is a cyclic dimer of D-lactic acid, meso-lactide which is a cyclic dimer of L-lactic acid and D-lactic acid or a mixture thereof.

Although the polylactic acid (component A-1) is not particularly limited, it is produced by a commonly known melt polymerization process or a combination of the melt polymerization process and a solid-phase polymerization process. Examples of the processes are disclosed by U.S. Pat. No. 1,995,970, U.S. Pat. No. 2,362,511 and U.S. Pat. No. 2,683,136, and the polylactic acid is synthesized from a cyclic dimer of lactic acid which is generally called "lactide" by ring-opening polymerization. U.S. Pat. No. 2,758,987 discloses a ring-opening polymerization process in which a cyclic dimer of lactic acid (lactide) is melt polymerized.

The copolymer is obtained mainly from a lactic acid. Examples of the copolymer include a lactic acid-hydroxycarboxylic acid copolymer and a lactic acid-aliphatic polyhydric alcohol-aliphatic polybasic acid copolymer.

Examples of the hydroxycarboxylic acid include glycolic acid, 3-hydroxybutyric acid, 4-hydroxybutyric acid, 4-hydroxyvaleric acid, 5-hydroxyvaleric acid and 6-hydroxycaproic acid. They may be used alone or in combination of two or more. A cyclic ester intermediate of hydroxycarboxylic acid such as glycolide which is a dimer of glycolic acid or s-caprolactone which is a cyclic ester of 6-hydroxycaproic acid may also be used.

Examples of the aliphatic polyhydric alcohol include aliphatic diols such as ethylene glycol, diethylene glycol, triethylene glycol, polyethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, decamethylene glycol and 1,4-cyclohexane dimethanol. They may be used alone or in combination of two or more.

Examples of the aliphatic polybasic acid include aliphatic dibasic acids such as succinic acid, oxalic acid, malonic acid, glutaric acid, adipic acid, pimelic acid, suberic acid, azelaic acid, sebacic acid, undecanedioic acid and dodecanedioic acid. They may be used alone or in combination of two or more.

The hydroxycarboxylic acid copolymer is generally synthesized by the ring-opening polymerization of lactide or a cyclic ester intermediate of a hydroxycarboxylic acid, and its production process is disclosed by U.S. Pat. No. 3,635,956 and U.S. Pat. No. 3,797,499. U.S. Pat. No. 5,310,865 discloses a process in which lactic acid or a mixture of lactic acid and hydroxycarboxylic acid is used as a raw material and directly dehydrated and polycondensed. U.S. Pat. No. 4,057,537 discloses a ring-opening polymerization process in which cyclic dimers of lactic acid and an aliphatic hydroxycarboxylic acid, for example, lactide and glycolide, and ε-caprolactone are melt polymerized in the presence of a catalyst. When a lactic acid-based resin is produced directly by dehydration polycondensation and not ring-opening polymerization, a polylactic acid copolymer is obtained by carrying out the azeotropic dehydration condensation of a lactic acid and optionally another hydroxycarboxylic acid preferably in the presence of an organic solvent, especially a phenyl ether-based solvent. Polymerization is preferably carried out by removing water from the solvent distilled out by azeotropy to return a substantially anhydrous solvent into a reaction system.

U.S. Pat. No. 5,428,126 discloses a process in which a mixture of lactic acid, an aliphatic dihydric alcohol and an aliphatic dibasic acid is directly dehydrated and condensed. European Patent No. 0712880A2 discloses a process in which a polymer of polylactic acid and a polymer of an aliphatic dihydric alcohol and an aliphatic dibasic acid are condensed in the presence of an organic solvent.

In the present invention, a suitable molecular weight control agent, a branching agent and a modifier may be added for the production of the lactic acid copolymer.

Polylactic acid which is composed of only a lactic acid unit is preferably used in the present invention, and poly-L-lactic acid which is obtained mainly from L-lactic acid is particularly preferred. In general, L-lactic acid contains D-lactic acid which is an optical isomer, and its content is preferably not more than 15 wt %, more preferably not more than 10 wt %, particularly preferably not more than 5 wt %. When a large amount of the optical isomer is contained, the crystallinity of the polylactic acid is reduced with the result that the obtained polylactic acid becomes softer. Although the optical isomer is advantageously used for a molded article which is desired to be soft, it is not preferred for a composition which requires heat resistance.

(Aromatic Polycarbonate Resin: Component A-2)

Examples of the aromatic polycarbonate resin (component A-2) include polycarbonate resins obtained by an interfacial polymerization reaction between a dihydroxyaryl compound and phosgene in the presence of a solvent such as methylene chloride and polycarbonate resins obtained by a transesterification reaction between a dihydroxyaryl compound and diphenyl carbonate. A typical example of the aromatic polycarbonate resin is obtained from a reaction between 2,2'-bis(4-hydroxyphenyl)propane and phosgene.

Examples of the dihydroxyaryl compound which is a raw material of the aromatic polycarbonate resin (component A-2) include bis(4-hydroxyphenyl)methane, 1,1'-bis(4-hydroxyphenyl)ethane, 2,2'-bis(4-hydroxyphenyl)propane, 2,2'-bis(4-hydroxyphenyl)butane, 2,2'-bis(4-hydroxyphenyl)octane, 2,2'-bis(4-hydroxy-3-methylphenyl)propane, 2,2'-bis(4-hydroxy-3-t-butylphenyl)propane, 2,2'-bis(3,5-dimethyl-4-hydroxyphenyl)propane, 2,2'-bis(4-hydroxy-3-cyclohexylphenyl)propane, 2,2'-bis(4-hydroxy-3-methoxyphenyl)propane, 1,1'-bis(4-hydroxyphenyl)cyclopentane, 1,1'-bis(4-hydroxyphenyl)cyclohexane, 1,1'-bis(4-hydroxyphenyl)cyclododecane, 4,4'-dihydroxyphenyl ether, 4,4'-dihydroxy-3,3'-dimethylphenyl ether, 4,4'-dihydroxydiphenyl sulfide, 4,4'-dihydroxy-3,3'-dimethyldiphenyl sulfide, 4,4'-dihydroxydiphenyl sulfoxide, 4,4'-dihydroxydiphenyl sulfone and bis(4-hydroxyphenyl)ketone. These dihydroxyaryl compounds may be used alone or in combination of two or more.

The dihydroxyaryl compound is preferably selected from bisphenols which form an aromatic polycarbonate having high heat resistance, bis(hydroxyphenyl)alkanes such as 2,2'-bis(4-hydroxyphenyl)propane, bis(hydroxyphenyl)cycloalkanes such as bis(4-hydroxyphenyl)cyclohexane, dihydroxydiphenyl sulfide, dihydroxydiphenyl sulfone and dihydroxydiphenyl ketone. The dihydroxyaryl compound is particularly preferably 2,2'-bis(4-hydroxyphenyl)propane which forms a bisphenol A type aromatic polycarbonate.

As long as heat resistance and mechanical strength are not impaired, when a bisphenol A type aromatic polycarbonate is to be produced, part of bisphenol A may be substituted by another dihydroxyaryl compound.

A brief description is given of the basic means for producing the aromatic polycarbonate resin (component A-2). In the interfacial polymerization process (solution polymerization process) in which phosgene is used as a carbonate precursor, a reaction is generally carried out in the presence of an acid binder and an organic solvent. Examples of the acid binder include alkali metal hydroxides such as sodium hydroxide and potassium hydroxide, and amine compounds such as pyridine. Examples of the organic solvent include halogenated hydrocarbons such as methylene chloride and chlorobenzene. A catalyst such as tertiary amine or quaternary amine may be used to promote the reaction. A terminal capping agent such as phenol or alkyl-substituted phenol as exemplified by p-tert-butylphenol is desirably used as a molecular weight control agent. The reaction temperature is generally 0 to 40° C., the reaction time is several minutes to 5 hours, and pH during the reaction is preferably kept at 10 or more. All the terminals of the obtained molecular chain do not need to have a structure derived from the terminal capping agent.

In the transesterification reaction (melt polymerization process) in which a diester carbonate is used as the carbonate precursor, a predetermined amount of a dihydric phenol is stirred together with the diester carbonate in the presence of an inert gas under heating, and the formed alcohol or phenol is distilled off. The reaction temperature which differs according to the boiling point of the formed alcohol or phenol is generally 120 to 350° C. The reaction is completed while the formed alcohol or phenol is distilled off by reducing the pressure from the initial stage. A terminal capping agent is added at the same time as the dihydric phenol in the initial stage of the reaction or in the middle of the reaction. An existing known catalyst which is used for a transesterification reaction may be used to promote the reaction.

Examples of the diester carbonate used in this transesterification reaction include diphenyl carbonate, dinaphthyl carbonate, dimethyl carbonate, diethyl carbonate and dibutyl carbonate. Out of these, diphenyl carbonate is particularly preferred.

The molecular weight of the aromatic polycarbonate resin (component A-2) does not need to be particularly limited but if it is too low, strength becomes unsatisfactory and if it is too high, melt viscosity becomes high, thereby making molding difficult. The molecular weight of the aromatic polycarbonate resin is generally $1.0 \times 10^4$ to $5.0 \times 10^4$, preferably $1.5 \times 10^4$ to $3.0 \times 10^4$ in terms of viscosity average molecular weight. The viscosity average molecular weight (M) is obtained by inserting the specific viscosity ($\eta_{sp}$) of a solution prepared by dissolving 0.7 g of the polycarbonate resin in 100 ml of methylene chloride at 20° C. into the following equation.

$$\eta_{sp}/C=[\eta]+0.45\times[\eta]^2 C$$

$$[\eta]=1.23\times10^{-4} M^{0.83}$$

([η] is an intrinsic viscosity and C is 0.7 as the concentration of the polymer.)

(Styrene-Based Resin: Component A-3)

The styrene-based resin (component A-3) is a homopolymer or copolymer of an aromatic vinyl monomer such as styrene, α-methylstyrene or vinyl toluene. It may be a copolymer of one of these monomers and a vinyl monomer such as acrylonitrile or methyl methacrylate. It may also be a graft polymer obtained by graft polymerizing a diene-based rubber such as polybutadiene, ethylene.propylene-based rubber or acrylic rubber with styrene and/or a styrene derivative, or styrene and/or a styrene derivative with another vinyl monomer.

Examples of the styrene-based resin include polystyrene, impact-resistant polystyrene (HIPS), acrylonitrile.styrene copolymer (AS resin), acrylonitrile. butadiene.styrene copolymer (ABS resin), methyl methacrylate.butadiene.styrene copolymer (MBS resin), methyl methacrylate.acrylonitrile.butadiene.styrene copolymer (MABS resin), acrylonitrile.acrylic rubber. styrene copolymer (AAS resin), acrylonitrile.ethylene propylene-based rubber.styrene copolymer (AES resin), and mixtures thereof. It is preferably an acrylonitrile.styrene copolymer (AS resin), its production process is not particularly limited, and it is obtained by known bulk polymerization, bulk suspension polymerization, solution polymerization or emulsion polymerization.

<Organic Phosphorus Compound: Component B)

In the present invention, the organic phosphorus compound (component B) is represented by the following formula (1).

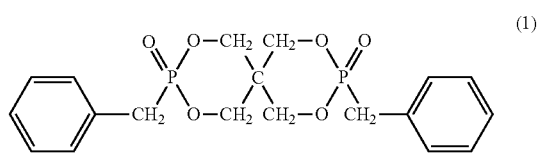

(In the above formula (1), the phenyl group may have a substituent.)

In the above formula, preferably, the phenyl group has no substituent. However, the phenyl group in the formula (1) may have a substituent at any part other than the part bonded to a methylene group through a carbon atom on the aromatic ring. Examples of the substituent include methyl group, ethyl group, propyl group (including an isomer thereof), butyl group (including an isomer thereof) and aryl group having 6 to 14 carbon atoms and bonded to the aromatic ring through oxygen, sulfur or aliphatic hydrocarbon group having 1 to 4 carbon atoms. Examples of the phenyl group having a substituent include cresyl group, xylyl group, trimethylphenyl group, 4-phenoxyphenyl group, cumyl group, naphthyl group and 4-benzylphenyl group. The organic phosphorus compound (component B) represented by the above formula (1) has an extremely excellent flame retarding effect for the polylactic acid. As far as the inventors of the present invention know, the halogen-free flame retardation of the polylactic acid has been difficult with a small amount of a flame retardant and has had a large number of problems to be solved for practical use. However, according to the present invention, surprisingly, the flame retardation of the polylactic acid is easily attained by using a small amount of the above organic phosphorus compound (component B) alone without impairing the characteristic properties of the polylactic acid. In the present invention, a phosphorus compound except for the component B, a fluorine-containing resin or other additives may be used in addition to the component B in order to reduce the amount of the component B and improve the flame retardancy, physical properties and chemical properties of a molded article and for other purposes.

A description is subsequently given of the method of synthesizing the above organic phosphorus compound (component B). The component B may be produced by a method except for the method described below.

The component B is obtained by reacting phosphorus trichloride with pentaerythritol, treating the oxidized reaction product with an alkali metal compound such as sodium methoxide, and reacting an aralkyl halide with the reaction product.

The component B may also be obtained by a method in which pentaerythritol is reacted with aralkyl phosphonic acid dichloride, or a method in which pentaerythritol is reacted with phosphorus trichloride and then the obtained compound is reacted with an aralkyl alcohol to carry out Arbuzov rearrangement at a high temperature. The latter reaction is disclosed in U.S. Pat. No. 3,141,032, JP-A 54-157156 and JP-A 53-39698.

The organic phosphorus compound (component B) may be synthesized not only by these methods but also by modified methods thereof and other methods. More specific synthesizing methods will be described in Preparation Examples which are given hereinafter.

An organic phosphorus compound (component B) which has an acid value of not more than 0.7 mgKOH/g, preferably not more than 0.5 mgKOH/g is used. By using the component B having an acid value within this range, a molded article which is excellent in flame retardancy and color and has high thermal stability is obtained. The acid value of the component B is most preferably not more than 0.4 mgKOH/g. The term "acid value" means the amount (mg) of KOH required for neutralizing the acid component contained in 1 g of a sample (component B).

Further, the component B having an HPLC purity of preferably at least 90%, more preferably at least 95% is used. The component B having such a high HPLC purity is excellent in the flame retardancy, color and thermal stability of a molded article obtained therefrom. The HPLC purity of the component B can be effectively measured by the following method.

The Develosil ODS-7 having a length of 300 mm and a diameter of 4 mm of Nomura Chemical Co., Ltd. was used as a column, and the column temperature was set to 40° C. A mixed solution of acetonitrile and water in a volume ratio of 6:4 was used as a solvent, and 5 µl of the solution was injected. An UV-260 nm detector was used.

The method of removing impurities contained in the component B is not particularly limited but a method in which repulp cleaning (cleaning with a solvent and filtration are repeated several times) is carried out with a solvent such as water or methanol is the most effective and economically advantageous.

The content of the organic phosphorus compound (component B) is 10 to 50 parts by weight, preferably 10 to 40 parts by weight, more preferably 15 to 35 parts based on 100 parts by weight of the resin component (component A). The preferred range of the content of the component B is determined according to the desired level of flame retardancy and the type of the resin component (component A). Other components except for the components A and B constituting the composition may be optionally used as long as the object of the present invention is not impaired. The content of the component B can be changed by using another flame retardant, a retarding aid or a fluorine-containing resin. In most cases, the content of the component B can be reduced by using these substances.

(Hydrogenated Styrene-Based Thermoplastic Elastomer: Component C)

The hydrogenated styrene-based thermoplastic elastomer (component C) is a terpolymer obtained by hydrogenating a polymer containing a conjugated diene in the recurring unit. The method of polymerizing a polymer containing a conjugated diene to be hydrogenated in the recurring unit is not particularly limited, and the hydrogenated styrene-based thermoplastic elastomer may be produced by prior art such as anion polymerization, cation polymerization, free radical polymerization, ligand polymerization, solution polymerization or emulsion polymerization.

Examples of the polymer containing a conjugated diene in the recurring unit include a styrene-butadiene copolymer, styrene-isoprene copolymer and styrene-isopentadiene copolymer. The styrene-butadiene copolymer is preferred.

The hydrogenation method of the hydrogenated styrene-based thermoplastic elastomer (component C) is not particularly limited and can be carried out based on prior art disclosed, for example, by JP-A 2007-301449.

Examples of the hydrogenated styrene-based thermoplastic elastomer (component C) include a styrene-ethylene-butylene-styrene terpolymer (SEBS) obtained by hydrogenating a styrene-butadiene copolymer, styrene-ethylene-propylene-styrene terpolymer (SEPS) obtained by hydrogenating a styrene-isoprene copolymer, and styrene-ethylene-propylene-styrene terpolymer (SEEPS) obtained by hydrogenating a styrene-isopentadiene copolymer. The styrene-ethylene-butylene-styrene terpolymer (SEES) obtained by hydrogenating a styrene-butadiene copolymer (SEBS) is preferred.

The content of the hydrogenated styrene-based thermoplastic elastomer (component C) is 5 to 30 parts by weight, preferably 10 to 20 parts by weight based on 100 parts by weight of the component A.

(Talc: Component D)

Talc (component D) is not particularly limited, and commercially available talc may be generally used. The talc is preferably talc having a particle diameter of 500 to 1,000 mesh, particularly preferably talc having a particle diameter of 600 to 900 mesh.

The content of the talc (component D) is 1 to 10 parts by weight, preferably 2 to 8 parts by weight based on 100 parts by weight of the resin component (component A).

<Preparation of Flame Retardant Resin Composition>

The flame retardant resin composition of the present invention can be prepared by pre-mixing together the resin component (component A), the organic phosphorus compound (component B), the hydrogenated styrene-based thermoplastic elastomer (component C) and talc (component D) and optionally other components and melt mixing them together.

Premixing may be carried out by using a twin-cylinder mixer, super mixer, super floater or Henschel mixer. Melt mixing may be carried out by using a kneader. As the kneader may be used a melt mixer such as a kneader, or single-screw or double-screw extruder. A method in which a double-screw extruder is used to melt the resin composition at 190 to 250° C., preferably 200 to 240° C. and a liquid component is injected into the resin composition by a side feeder, extruded and pelletized by a pelletizer is particularly preferably employed.

The flame retardant resin composition of the present invention contains substantially no halogen, has extremely high flame retardancy and is useful as a material for forming various molded articles such as home electric appliance parts, electric and electronic parts, auto parts, mechanical and electromechanical parts, and cosmetic containers. More specifically, it can be advantageously used in breaker parts, switch parts, motor parts, ignition coil cases, power plugs, power receptacles, coil bobbins, connectors, relay cases, fuse cases, flyback transformer parts, focus block parts, distributor caps and harness connectors. Further, it is useful for housings, casings and chassis which are becoming thinner, for example, housings for electric and electronic products (for example, home electric appliances and OA equipment such as telephones, personal computers, printers, facsimiles, copiers, TV, video decks and audio equipment, and parts thereof), casings and chassis. It is particularly useful for mechanical and electromechanical parts for home electric appliances and OA equipment, such as printer housings, fixing unit parts and facsimiles all of which require excellent heat resistance and flame retardancy.

The molding technique is not particularly limited and may be injection molding, blow molding or press molding. However, preferably, a pellet resin composition is injection molded by using an injection molding machine.

The flame retardant resin composition of the present invention can achieve at least V-2 rating in UL-94 flame retardancy level.

The present invention includes a method of improving the flame retardancy of a resin composition, comprising adding a compound represented by the formula (1) to a resin composition containing polylactic acid.

EXAMPLES

The following examples are provided for the purpose of further illustrating the present invention but are in no way to be taken as limiting. Evaluations were made by the following methods.

(1) Flame retardancy (UL-94 rating)

A test piece having a thickness of 1/16 inch (1.6 mm) was used to evaluate its flame retardancy in accordance with a vertical burn test specified in US UL-94 standards as a measure of evaluating flame retardancy.

The UL-94 vertical burn test is made on a set of five test pieces, and a flame is applied to each of the specimens for 10 seconds twice. This is not applied to a test piece which is burnt down with the first flame application. After a first time of flaming combustion, the combustion time after the flame is removed is measured, and a second flame is applied after extinction. After the second flame application, the combustion time after the flame is removed is measured. A total of 10 combustion times can be measured by tests on a set of five specimens. When burning stops within 10 seconds, the total of 10 combustion times is 50 seconds or less, and cotton is not ignited by flaming drips from any specimen, the specimen is rated V-0. When burning stops within 30 seconds, the total of 10 combustion times is 250 seconds or less, and cotton is not ignited by flaming drips from any specimen, the specimen is rated V-1. When burning stops within 30 seconds, the total of 10 combustion times is 250 seconds or less, and cotton is ignited by flaming drips from any specimen, the specimen is rated V-2. A specimen rated below this is designated as "not V".

(2) impact strength

This was measured in accordance with ASTM D256.

(3) deflection temperature under load (HDT)

This was measured in accordance with ASTM D648.

(4) acid value of organic phosphorus compound

This was measured in accordance with JIS-K-3504.

(5) HPLC purity of organic phosphorus compound

A sample was dissolved in a mixed solution of acetonitrile and water in a volume ratio of 6:4, and 5 µl of the resulting solution was injected into a column. The Develosil ODS-7 having a length of 300 mm and a diameter of 4 mm of Nomura Chemical Co., Ltd. was used as the column, and the column temperature was set to 40° C. A UV-260 nm detector was used.

(6) $^{31}$PNMR purity of organic phosphorus compound

The nuclear magnetic resonance of a phosphorus atom was measured (DMSO-$d_6$, 162 MHz, integrated number of times of 3072) with a nuclear magnetic resonance measuring instrument (JNM-AL400 of JEOL Ltd.) to obtain an integral area ratio as the $^{31}$PNMR purity of the phosphorus compound.

Preparation Example 1

Preparation of 2,4,8,10-tetraoxa-3,9-diphosphaspiro [5.5]undecane, 3,9-dibenzyl-3,9-dioxide (FR-1)

22.55 g (0.055 mole) of 3,9-dibenzyloxy-2,4,8,10-tetraoxa-3,9-diphosphaspiro[5.5 ]undecane, 19.01 g (0.11 mole) of benzyl bromide and 33.54 g (0.32 mole) of xylene were charged into a reactor having a stirrer, a thermometer and a condenser, and dry nitrogen was let flow into the reactor under agitation at room temperature. These substances were started to be heated in an oil bath, heated at a reflux temperature (about 130° C.) for 4 hours and stirred. After heating, the reaction mixture was left to be cooled to room temperature and further stirred for another 30 minutes. The precipitated crystal was separated by filtration and washed with 20 mL of xylene twice. The obtained roughly purified product and 40 mL of methanol were fed to a reactor having a condenser and a stirrer and refluxed for about 2 hours. The crystal was cooled to room temperature, separated by filtration and washed with 20 mL of methanol, and the obtained filtrate was dried at 120° C. and 1.33×10² Pa for 19 hours to obtain a white flaky crystal. It was confirmed by mass spectral analysis, $^1$H and $^{31}$P nuclear magnetic resonance spectral analysis and elemental analysis that the product was 2,4,8,10-tetraoxa-3,9-diphosphaspiro[5.5]undecane, 3,9-dibenzyl-3,9-dioxide (bisbenzyl pentaerythritol diphosphonate). The yield was 20.60 g, the yield rate was 91%, the $^{31}$PNMR purity was 99%. The HPLC Purity measured by the method of this text was 99%. The acid value was 0.05 mgKOH/g.

$^1$H-NMR (DMSO-$d_6$, 300 MHz): δ7.2-7.4 (m, 10H), 4.1-4.5 (m, 8H), 3.5 (d, 4H), $^{31}$P-NMR (DMSO-$d_6$, 120 MHz): δ23.1 (S), melting point: 257° C.

The following components were used in Examples and Comparative Examples.

(I) Polylactic acid resin (component A-1)

Commercially available polylactic acid resin (4032D of Nature Works Co., Ltd.; poly-L-lactic acid resin) was used (to be referred to as "PLA" hereinafter).

(II) Polycarbonate resin (component A-2)

Commercially available polycarbonate resin (Panlite L-1225 of Teijin Chemicals, Ltd., viscosity average molecular weight of 22,000) was used (to be referred to as "PC" hereinafter).

(III) Styrene-based resin (component A-3)

A commercially available styrene acrylonitrile copolymer (KIBISAN PN-127 of Chimei Co., Ltd.) was used (to be referred to as "SAN" hereinafter).

(IV) Organic phosphorus compound (component B)

(i) 2,4,8,10-tetraoxa-3,9-diphosphaspiro[5.5]undecane, 3,9-dibenzyl-3,9-dioxide (organic phosphorus compound of the above formula (1) (the phenyl group has no substituent) synthesized in Preparation Example 1 was used (to be referred to as "FR-1" hereinafter).

(Organic Phosphorus Compound Other than Component B)

(ii) 1,3-phenylenebis[di(2,6-dimethylphenyl)phosphate] (PX-200 of Daihachi Chemical Industry Co., Ltd.) was used (to be referred to as "PX-200" hereinafter).

(V) Hydrogenated styrene-based thermoplastic elastomer (component C)

A commercially available SEBS copolymer (TAIPOL SEBS3151 of TSRC Corporation) was used (to be referred to as "SEBS" hereinafter).

(VI) Filler (component D)

Commercially available talc (particle diameter of 800 mesh) was used (to be referred to as "talc" hereinafter).

Examples 1 and 2 and Comparative Examples 1 to 3

PLA as the component A-1 was dried at 50° C. under reduced pressure for 24 hours or more and other components were dried at 70° C. under reduced pressure for 24 hours or more.

The components shown in Table 1 were mixed together in amounts (parts by weight) shown in Table 1 by means of a tumbler, and the resulting mixture was pelletized by using a 35 mm-diameter double-screw extruder (L/D=36, revolution of 250 rpm, 185 to 195° C.). The obtained pellet was dried at 80° C. with a hot air drier for 3 hours and molded by an injection molding machine (clamping force of 100 t).

Evaluation results obtained by using molded plates are shown in Table 1.

TABLE 1

| Component | | Unit | Ex. 1 | Ex. 2 | C. Ex. 1 | C. Ex. 2 | C. Ex. 3 |
|---|---|---|---|---|---|---|---|
| Composition | Component A | Parts by weight (component A-1) | 100 | 100 | 100 | 100 | 100 |
| | Component B | Type | FR-1 | FR-1 | — | PX-200 | PX-200 |
| | | Parts by weight | 20 | 30 | — | 20 | 30 |
| | Component C | Parts by weight | 10 | 10 | 10 | 10 | 10 |
| | Component D | Parts by weight | 5 | 5 | 5 | 5 | 5 |
| Flame retardancy | UL-94 test | Thickness of test piece | 1.6 mm | 1.6 mm | 1.6 mm | 1.6 mm | 1.6 mm |
| | | UL rating | V-2 | V-0 | not V | V-2 | V-0 |
| Impact strength | ASTM D256 | Notched, J/m | 45 | 46 | 100 | 70 | 48 |
| | | Without a notch, J/m | 141 | 140 | 340 | 247 | 223 |
| HDT | ASTM D648 | ⅛", 0.45 MPa, ° C. | 56 | 58 | 56 | 46 | 44 |
| | | ¼", 0.45 MPa, ° C. | 63 | 64 | 64 | 50 | 48 |

Ex.: Example C. Ex.: Comparative Example

Examples 3 and 4 and Comparative Examples 4 to 6

PLA as the component A-1 was dried at 50° C. under reduced pressure for 24 hours or more and other components were dried at 70° C. under reduced pressure for 24 hours or more.

The components shown in Table 2 were mixed together in amounts (parts by weight) shown in Table 2 by means of a tumbler, and the resulting mixture was pelletized by using a 35 mm-diameter double-screw extruder (L/D=36, revolution of 250 rpm, extrusion temperature of 210 to 220° C.). The obtained pellet was dried at 80° C. with a hot air drier for 3 hours and molded by an injection molding machine (clamping force of 100 t).

Evaluation results obtained by using molded plates are shown in Table 2.

with a relatively small amount of the organic phosphorus compound and even V-0 rating is achieved under preferred conditions.

(iii) Due to the structure and characteristic properties of the organic phosphorus compound (component B) used as a flame retardant, a resin composition having excellent thermal stability is obtained without causing the thermal deterioration of polylactic acid at the time of molding polylactic acid or using the molded article. Therefore, a resin composition having good balance among flame retardancy, mechanical strength and thermal stability is obtained.

INDUSTRIAL FEASIBILITY

The flame retardant resin composition of the present invention is useful as a material for forming various molded articles

TABLE 2

| Component | | Unit | Ex. 3 | Ex. 4 | C. Ex. 4 | C. Ex. 5 | C. Ex. 6 |
|---|---|---|---|---|---|---|---|
| Composition | Component A | Parts by weight (component A-1) | 70 | 75 | 70 | 70 | 75 |
| | | Parts by weight (component A-2) | 27 | 22.5 | 27 | 27 | 22.5 |
| | | Parts by weight (component A-3) | 3 | 2.5 | 3 | 3 | 2.5 |
| | Component B | Type | FR-1 | FR-1 | — | PX-200 | PX-200 |
| | | Parts by weight | 20 | 30 | — | 20 | 30 |
| | Component C | Parts by weight | 15 | 15 | 15 | 15 | 15 |
| | Component D | Parts by weight | 5 | 5 | 5 | 5 | 5 |
| Flame retardancy | UL-94 test | Thickness of test piece | 1.6 mm | 1.6 mm | 1.6 mm | 1.6 mm | 1.6 mm |
| | | UL rating | V-2 | V-0 | not V | not V | not V |
| Impact strength | ASTM D256 | Notched, J/m | 40 | 42 | 100 | — | — |
| | | Without a notch, J/m | 215 | 141 | 360 | — | — |
| HDT | ASTM D648 | ⅛", 0.45 MPa, ° C. | 59 | 61 | 60 | — | — |
| | | ¼", 0.45 MPa, ° C. | 83 | 117 | 113 | — | — |

Ex.: Example C. Ex.: Comparative Example

EFFECT OF THE INVENTION

The flame retardant resin composition of the present invention and a molded article formed therefrom have the following advantages as compared with a conventional polylactic acid composition.

(i) They have a high level of flame retardancy without using a halogen-containing flame retardant.

(ii) Since the organic phosphorus compound (component B) as a flame retardant has an excellent flame retarding effect for polylactic acid (component A-1), V-2 rating is achieved such as home electric appliance parts, electric and electronic parts, auto parts, mechanical and electromechanical parts, and cosmetic containers.

The invention claimed is:

1. A flame retardant resin composition comprising:
(A) 100 parts by weight of a resin component (component A) containing polylactic acid (component A-1);
(B) 10 to 50 parts by weight of an organic phosphorus compound represented by the following formula (1) (component B):

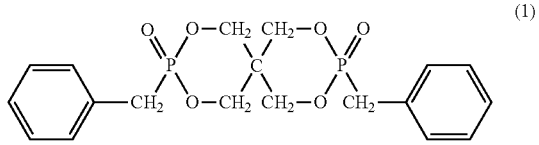 (1)

(in the above formula, the phenyl group may have a substituent);
(C) 5 to 30 parts by weight of a hydrogenated styrene-based thermoplastic elastomer (component C); and
(D) 1 to 10 parts by weight of talc (component D).

2. The flame retardant resin composition according to claim 1, wherein the resin component (component A) contains not less than 50 wt % of polylactic acid (component A-1).

3. The flame retardant resin composition according to claim 1, wherein the resin component (component A) contains 50 to 89 wt % of polylactic acid (component A-1), 10 to 40 wt % of an aromatic polycarbonate resin (component A-2) and 1 to 10 wt % of a styrene-based resin (component A-3).

4. The flame retardant resin composition according to claim 1, wherein the polylactic acid (component A-1) is poly-L-lactic acid.

5. The flame retardant resin composition according to claim 3, wherein the styrene-based resin (component A-3) is an acrylonitrile styrene copolymer.

6. The flame retardant resin composition according to claim 1, wherein the acid value of the organic phosphorus compound (component B) is not more than 0.7 mgKOH/g.

7. The flame retardant resin composition according to claim 1, wherein the hydrogenated styrene-based thermoplastic elastomer (component C) is a hydrogenated SEBS terpolymer.

8. The flame retardant resin composition according to claim 1, wherein the talc (component D) has a particle diameter of 500 to 1,000 mesh.

9. The flame retardant resin composition according to claim 1 which achieves at least V-2 rating in UL-94 flame retardancy level.

10. A molded article formed from the flame retardant resin composition of claim 1.

* * * * *